Figure 1:
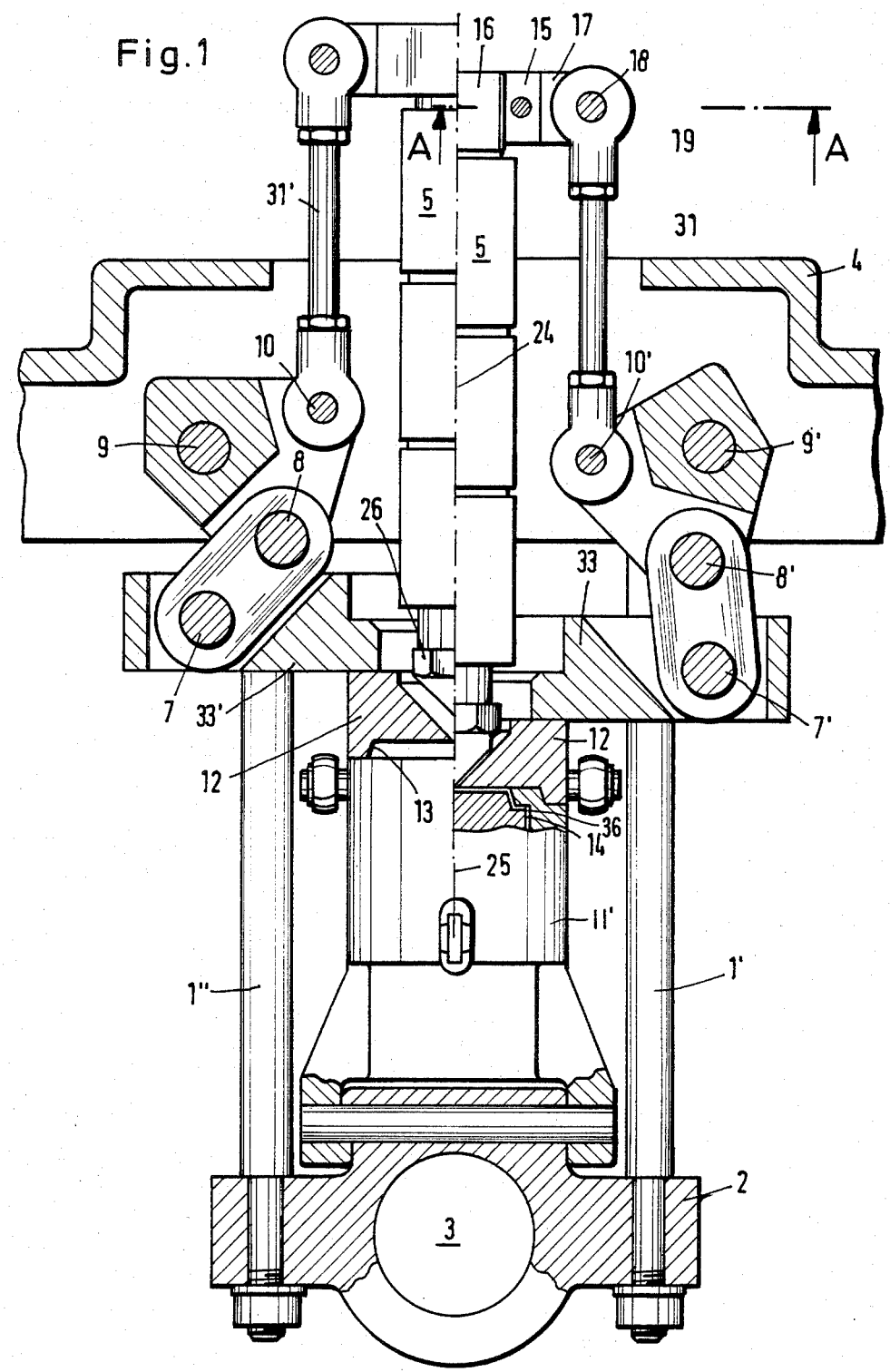

United States Patent [19]

Reil et al.

[11] Patent Number: 4,525,318
[45] Date of Patent: Jun. 25, 1985

[54] APPARATUS FOR MOULDING A PLASTICS COMPONENT ONTO A LENGTH OF FLEXIBLE WEB MATERIAL AND METHOD FOR SAME

[75] Inventors: Wilhelm Reil, Bensheim; Ulrich Deutschbein, Mühltal; Manfred Wallich, Nauheim, all of Fed. Rep. of Germany

[73] Assignee: Tetra Pak Developpement S.A., Pully, Switzerland

[21] Appl. No.: 467,448

[22] Filed: Feb. 17, 1983

[30] Foreign Application Priority Data

Mar. 4, 1982 [DE] Fed. Rep. of Germany ....... 3207701

[51] Int. Cl.³ .......................... B29F 1/022; B29C 5/00; B29D 31/00
[52] U.S. Cl. ........................... 264/259; 264/DIG. 41; 425/116; 425/121; 425/126 R; 425/576
[58] Field of Search ............. 264/DIG. 41, 259, 271.1, 264/279, 328.1; 425/116, 117, 126 R, 129 R, 125, 121, 542, 576, 577, 121; 100/272

[56] References Cited

U.S. PATENT DOCUMENTS

| | | | |
|---|---|---|---|
| 2,812,548 | 11/1957 | Quinche et al. | 425/129 |
| 3,020,594 | 2/1962 | Makowski | 425/129 |
| 3,159,701 | 12/1964 | Herter | 264/279 |
| 3,195,186 | 7/1965 | Gauban et al. | 425/595 |
| 3,262,158 | 7/1966 | von Remier et al. | 425/595 |
| 3,313,875 | 4/1967 | Magerle | 264/267 |
| 3,403,423 | 10/1968 | McMorrow et al. | 425/129 S |
| 3,429,007 | 2/1969 | Aoki | 425/119 |
| 3,496,608 | 2/1970 | Eldred et al. | 425/129 S |
| 3,540,524 | 11/1970 | Bachelier | 425/595 |
| 3,591,893 | 7/1971 | Vicini | 425/129 S |
| 4,351,629 | 9/1982 | Farrell | 425/116 |

Primary Examiner—Willard E. Hoag
Attorney, Agent, or Firm—Michael L. Dunn; Howard M. Ellis

[57] ABSTRACT

An apparatus is described for moulding a plastics component onto a length of flexible web material, particularly a paper tube coated with thermoplastic synthetic material, the apparatus comprising a complete injection unit (5), a nozzle (26), an injecting head portion (12), external mould portions (11,11') and a core (14) which can be moved relative to these. As a means of increasing the output of the apparatus given a continuous supply of the web material, the invention provides that the core (14) is arranged on the end of a mandrel (23) which carries the length of material (35) with it and which is part of a rotatable mandrel wheel driven in cadence about its drive shaft (3), with its mandrel (23) projecting radially in one plane, that the external mould portion (11, 11') has at least two mould portions (11, 11') which can be moved apart and together laterally of the mandrel (23) to free the circular path of the mandrel (23), and that the mould portions can be held together by bringing them into positive and frictional engagement with a movable head plate (12) at the nozzle side.

11 Claims, 10 Drawing Figures

APPARATUS FOR MOULDING A PLASTICS COMPONENT ONTO A LENGTH OF FLEXIBLE WEB MATERIAL AND METHOD FOR SAME

The invention relates to an apparatus for moulding a plastics component onto a length of flexible web material, comprising a complete injection unit with a nozzle, a moulding-on head portion, an external mould portion and a core which is movable relative to these.

It is general knowledge in the packaging industry that plastics components can be moulded onto other packing sections, particularly as a closure or cover. Such plastics components may be moulded onto a variety of materials, such as coated or uncoated papers, plastics materials or metals, to name only a few applications.

When single tools of the above type are used the output of the machine is relatively small. Multiple tools have therefore already been produced. These are fixed to a holding means adjacent one another, in a ring or other arrangement, and have different shapes which are pressed onto opposing shapes or cores. After the closing movement of the moulding tool the plastics material is injected into the resultant mould cavity, and the tool components then remain in that position until the moulded piece has cooled and cured. With these multiple tools the next cycle cannot start for a relatively long time.

The invention aims to provide a moulding-on apparatus of the above type, with which a high output can nevertheless be achieved with a single tool and a continuous supply of web material. It must also be possible to do this under conditions where a length of foreign material, e.g. a container blank, has to be fed to and carried away from the moulding station.

According to the invention this aim can be achieved, in that the core is arranged on the end of a mandrel which carries the length of material with it and which is part of a rotatable mandrel wheel driven in cadence about its drive shaft, with its mandrel projecting radially in one plane, that the external mould portion has at least two mould portions which can be moved apart and together laterally of the mandrel to free the circular path of the mandrel, and that the mould portions can be held together by bringing them into positive and frictional engagement with a movable head plate at the nozzle side. Particularly for the production of peaks for holding fluid materials, this enables e.g. plastics covers or bases to be moulded onto one end of a tube made of paper coated with thermoplastic synthetic material. The mandrel wheel of the above type is used, with the mandrel in question holding the length of material, in the special example the tube, for the injection process. Turning of that particular mandrel together with the wheel brings the free end of the tube, onto which the plastics cover is to be moulded, into alignment with the moulding machine. The mandrels constitute the bottom parts of moulding tools, i.e. core carriers, and the moulding cavity is formed by the external mould portions at the sides and the head plate at the top.

The difficulty with such an embodiment lies in absorbing the high pressures generated in the mould cavity. In the past this was done for the most part by the core of the moulding tool, and for this reason the high pressures here would have to be absorbed from the side of the mandrel, e.g. by means of toggle levers or hydraulic seals. However, the mounting of the mandrel wheel does not readily allow these strong forces to be absorbed through the bearing or through a flange on a gearing, and there is no room for toggle levers or other strong seals in the region of the mandrel, i.e. adjacent the core carrier, because of the drive for the mandrel wheel.

By using the mandrel wheel with the plurality of mandrels projecting perpendicularly to the axis of rotation, namely radially in a plane, the cycle of the new moulding on apparatus can be made very short. Although lengths are supplied in a continuous web of material, whether the web is moved continuously in one piece or continuously in the form of separate lengths, a high output can nevertheless be achieved, and in addition the length in question can be pulled over the mandrel before moulding and removed from it after moulding. This simplifies particularly the feed for the web material. However, the entire machine is also simpler; for one thing the use of a single tool is clearly easier to master and control than the use of a multiple tool, if one thinks of the many different conditions such as maintenance. A further advantage of using a single tool is that one moulded piece then looks like another, whereas with multiple tools slight differences are often inevitable.

The pressure acting outwardly from the moulding chamber and resulting from the actual moulding process can be absorbed better with the construction according to the invention; for with the strong components described the seals absorbing the pressure can be arranged in the correct place. For example, the above-mentioned head plate is arranged movably so that, in the event of there being only two external mould portions, it holds these two portions together with a frictional and positive connection, since it can be put over a fitting cylindrical or frusto-conical surface, while for the purpose of separating the external mould portions the head plate can be lifted off the cylindrical or frusto-conical surface. When the external mould portions move apart this advantageously makes to turn the mandrel out of the moulding position and turn a new mandrel into that position. In this way the output of the moulding machine can be considerably improved despite the use of a single tool of the complete moulding unit. The opening of the external mould portions and the turning of the mandrel out of the moulding position and into the next one gives the moulded piece time to cool and harden.

In accordance with the invention it is particularly desirable for the mandrel wheel to be driven by a step-by-step mechanism, by which the external mould portions are driven in a synchronously coupled movement. The apparatus according to the invention preferably has two drives, the step-by-step mechanism for the mandrel wheel and separable external mould portions, and e.g. a hydraulic drive means for the substantially straight movement of the complete moulding unit and head plate onto the core and away from it. The two drive units are synchronized with one another. The drive and movement take place as follows: where the length of material, e.g. a container section and preferably a hollow cylindrical part of a tube or sleeve has been pushed over one mandrel, the mandrel is pivoted into the main axis and thus the central axis of the moulding tool by the rotation of the mandrel wheel. In the meantime the drive has further been responsible for separating the external mould portions, of which there are at least two, so as to leave enough room for the mandrel, previously in the moulding position and acting as the core carrier, and thus also the core to be removed by turning. The mandrel previously described, with the newly applied tube or differently shaped length of material, then has enough space and time to be pivoted into the moulding position. When the moulding position has been reached the external mould portions are brought together and placed around the front end of the mandrel, i.e. around the core, so that the moulding chamber can be formed by the multi-part external mould, also by the core from below and finally by the head plate from above. The function of the movable head plate is to secure the separable external mould portions from lateral or radial movements resulting from the pressures arising in the moulding chamber. When the external mould portions have been brought together and while the head plate is being set down to secure them, the complete moulding unit is advanced to initiate the moulding process.

In accordance with the invention it is preferable for the mandrel wheel to be mounted for rotation in two stationary bearing plates which are joined to a main supporting plate by tie rods, and for the complete injection unit to be held for linear movement on a supporting post fixed to the main supporting plate. The high pressures which arise during moulding and which necessarily continue through the core of the moulding tool and the core carrier, i.e. the mandrel, are directed through the said tie rods to a main supporting plate, where there is enough room for powerful anchoring and screw elements despite the use of a mandrel wheel with the corresponding drive (step-by-step mechanism). The tie rods themselves may be formed by strong posts, stays or bars. The main supporting plate may preferably be made of cast metal and constructed in frame form, so that a stationary support is available here for all parts of the moulding machine. For this reason the complete moulding unit is also held by the supporting post fixed to the main supporting plate.

In order to simplify the drives, a further advantageous embodiment of the invention has a coupling fixed to the complete moulding unit, to connect drive rods which drive and possibly lock the head plate by means of a joint arrangement. It is a fixed coupling which transmits the movement of the complete moulding unit directly to connected drive rods, by which the movement of the coupling plate is controlled. This drive is also responsible for the locking arrangement, where the head plate secures and locks the external mould portions. A joint arrangement is preferably used for the drive moving the head plate, e.g. a toggle arrangement, so that strong forces can be generated and permit locking. The units used throughout the apparatus according to the invention must have a robust construction and high strength, so that they can take up the pressure arising in conjunction with the moulding process in addition to the tool weights and substances (Massen).

It is particularly advantageous, according to the invention, if a gap is provided between the core and the external mould portions, the size of the gap being somewhat smaller, preferably about 10% less, than the thickness of the flexible web material which is to be accommodated in and seal the gap and bound the moulding cavity. If the requirement is e.g. to mould plastics components onto one edge of a flat section of material, the material can likewise be seized by the mandrel, e.g. in a groove, and controlled like a container section. But for all possible forms of the section of web material the new consideration applies, that the moulding cavity is to be closed imperviously, not only by machine components but ultimately by the web material, that is to say, the rolled cavity is to be bounded by the web material in at least one place. This is done by clamping the web material in between two machine components forming the moulding cavity, e.g. moulding portions, here preferably between the core and the external mould portions, so that the free end of the material projects a certain distance into the moulding cavity. Thus for the first time a moulding cavity is provided, which is at least partly bounded by the actual material to which the moulded part is to be attached. The purpose of making the size of the gap somewhat smaller than the thickness of the web material is to apply the material with a sealing action, since flexible material can be compressed by about 10% of its thickness.

It is desirable if the length of flexible web material which is clamped onto the mandrel projects from the gap into the injection chamber, while lying against the inner surface of the external mould portions, far enough to bring the uncoated severed end surface of the length of material to at least $\frac{1}{2}$ mm away from the upper surface bounding the injection chamber. Particularly in the embodiment which has paper or cardboard as the supporting material, coated on both sides with plastics to make the pack impervious to liquids, detachment of the respective lengths of material from a web supplied from a reel creates a severed surface which is then no coated. The plastics portion must then be laid particularly over this uncoated end surface, and the moulding cavity must therefore be in direct contact with the severed surface, so that a space at least $\frac{1}{2}$ mm high has to be left above that surface.

The feature of having the length of web material lying against the inner surface of the external mould portions advantageously ensures that the plastics material injected through the nozzle does not go between the outer surface of the web material and the inner surface of the external mould portions and is injected only on the opposite side and onto the end surface, while the web material remains in intimate contact with the inner surface of the external mould portions. The moulding cavity is constructed with these features, in such a way that the plastics flow first passes onto the inside of the web material, then additionally onto the end or the severed end surface, thereby laying the web material on the inner surface of the external mould portions with pressure and helping it to adhere thereto. The flexible web material projects beyond the end of said gap between the core and the external mould portions, which is at the limit in the direction of the moulding cavity, and extends freely into the moulding cavity a certain distance towards the core.

It is further advantageous, according to the invention, for each mandrel to have a round cross section, for its central axis to be aligned with the central axis of the complete injection unit in the moulding position of the mandrel, and for at least two tie rods to be arranged parallel with the mandrel, spaced around the periphery. The central axis is the above-mentioned main axis of the complete injection unit, which runs parallel with the above-mentioned supporting post and along which the above-mentioned movement of the complete injection unit takes place. It is particularly desirable here if four tie rods, each at an angular spacing of 90° at the periphery, are arranged around and parallel with the mandrel. The joint arrangement for controlling the head plate can then be arranged in the lower part of the complete injection unit, preferably where its nozzle is moved backwards and forwards.

The apparatus described above is therefore particularly appropriate for use in moulding a plastics cover onto a tube of flexible web material, particularly paper coated with thermoplastic synthetic material, for the manufacture of liquid packs.

The drive used for the mandrel wheel is preferably a step-by-step mechanism, with the drive shaft for the mandrel wheel projecting laterally therefrom and being supported in the stationary bearing plate. In a special embodiment the particular container section, e.g. a tube 25 cm long, is received on a side opposite the external mould portions, is set at right angles or a different angle thereto and is swung into the main axis of the complete injection unit. The bearing means which serve to absorb the pressures arising during moulding are provided by the strongly constructed, stationary bearing plates. However, these can transmit the force via the tie rods to a place in the apparatus where there is enough room for fixing components, while there is no room in the region of the drive shaft for the mandrel wheel. In this way the components of the joint arrangement for driving the head plate can generate a strong bias and thus absorb the high pressures from the moulded part.

As compared with all previously known moulding-on apparatuses the invention thus sets the base of the core carrier in timed rotation. In other words the base of the core carrier rotates about its own axis. Thus the moulding tool is adapted to the continuously moving web of material, so that the coated or sprayed part of the web material is released immediately after the injection process. It will be appreciated that the output of the machine can be considerably improved despite the use of a single tool. This applies to all forms of material section, e.g. pieces in flat or at least partly curved areas, and we are here thinking particularly of a tube with a variety of cross sections, e.g. polygonal, oval, circular and the like. Whereas the previously known moulding apparatus the moulding cavity was provided by metallic contact between the core and the external mould portions, so that the high pressures arising from injection could be abosrbed well and above all so that an impervious closure could be provided, in the tube embodiment of the invention the moulding cavity is bounded by the edge of the tube. In this case of the tube, particularly a paper one coated with plastics, there is thus a hollow cylindrical space between the external mould portions of the tool and the core, to receive the tube or the end of the sleeve, this space being formed by the gap described above. When the plastics material passes from the nozzle into the moulding cavity moreover some of the air escapes through the channels in the paper, thereby further enhancing the feature that the direction of force of the injection pressure urges the end of the sleeve outwards into contact with the inner surface of the external mould portions ahd holds it there. In this way no plastics material goes between the sleeve and the external mould portion; it only goes along the inner edge of the subsequent finished pack and onto the stationary severed surface.

The output of the machine can advantageously be further increased if the apparatus is constructed so as to enable the moulding station to be arranged outside the feed and discharge stations.

In order to lengthen the stoppage times for the respective mandrels while maintaining the sine function of the movement of the step-by-step mechanism it is desirable, according to the invention, that the step-by-step mechanism of the mandrel wheel which can rotate in cadence is driven by means of a rocker arm, that the rocker arm has a clamping member, rotatable about an axis and with a cam fixed to it, whereby a cam follower is driven with guidance, that the cam follower is seated on a drive lever, the axis of which is the same as that of the step-by-step mechanism, and that the axis of the clamping member and the axis of the mechanism are a distance away from each other. The cam may be any curve, which should always be in engagement with the respective cam follower. The drive lever on which the cam follower is seated may be in the form of a crank, disc or similar machine component.

It is particularly favourable, in accordance with the invention, for the cam to be a rail which is U-shaped in cross section, particularly a straight rail with a guide roller swivelably mounted in it as a cam follower, and for the drive lever to be a crank. The crank is characterised by a drive journal which is arranged not centrally but excentrically on the crank, so that the crank has a short and a long lever arm, each relative to the axis of rotation of the crank. By means of the rocker arm thus constructed, with the two axially offset drive shafts, it is possible to obtain a movement of the drive shaft for the mandrel wheel from a motor driving at constant speed and ultimately from the output side of the step-by-step mechanism, the form of the movement being changed so that, although the character of the sine curve is maintained when the angular speed of the drive shaft of the mandrel wheel is plotted against time, the range of movement is considerably shortened in favour of the stoppage range, so that there is enough time for the injection process with its preparation and the subsequent steps. If the stepping angle is defined as the angle through which the mandrel turns, and the switching angle as that corresponding to the movement in time, then conventional step-by-step mechanisms, given a stepping angle of 90°, only have a switching angle of at least 90°, whereas with the invention one can obtain a stepping angle of 90° but a switching angle of 45°. This is desirable particularly when there is a mandrel wheel with four mandrels offset by 90° from one another in the direction of rotation. Different switching angles may be obtained by appropriately changing the distance between the axes of the drive shaft and drive journal, i.e. from the rocker arm at the input side towards the mandrel wheel at the output side.

The last-mentioned features of the invention using the rocker arm enable the sine function of the movement of the step-by-step mechanism to be maintained, and certainly its distortion in favour of a longer stoppage period.

Figure 2:
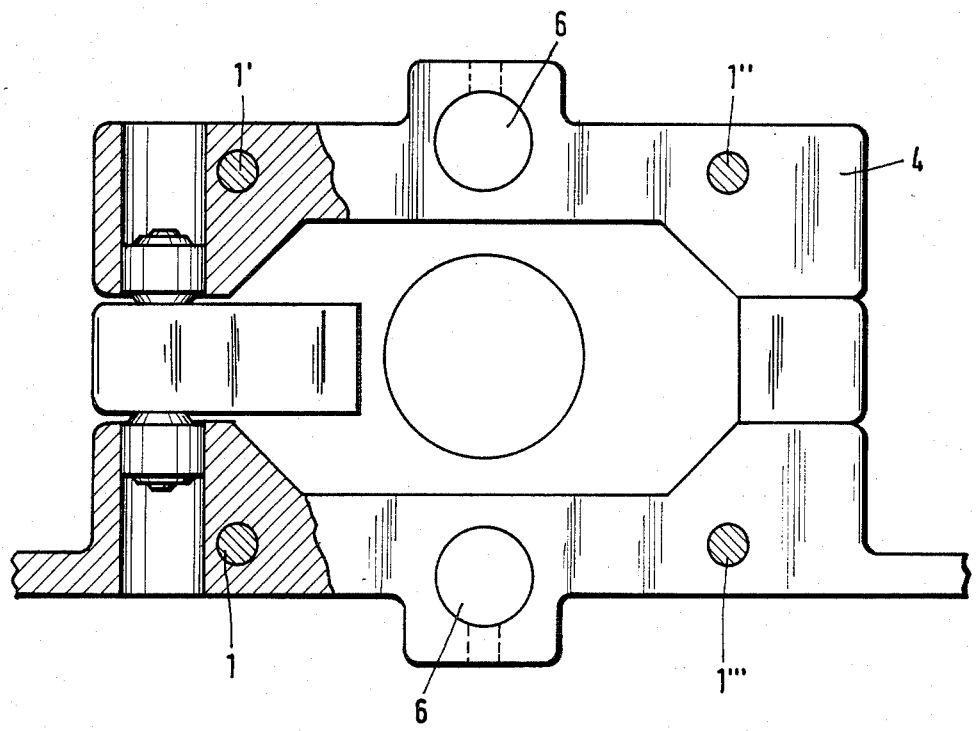
Figure 3:
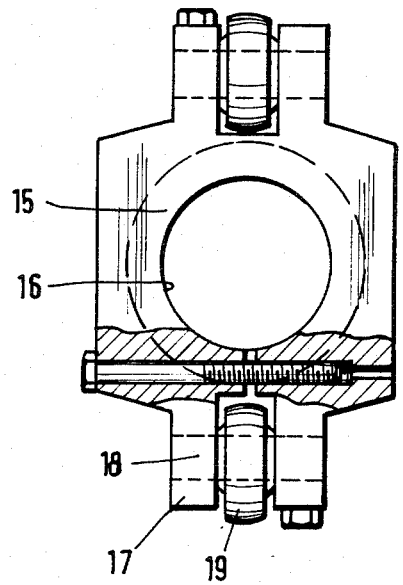
Figure 4:
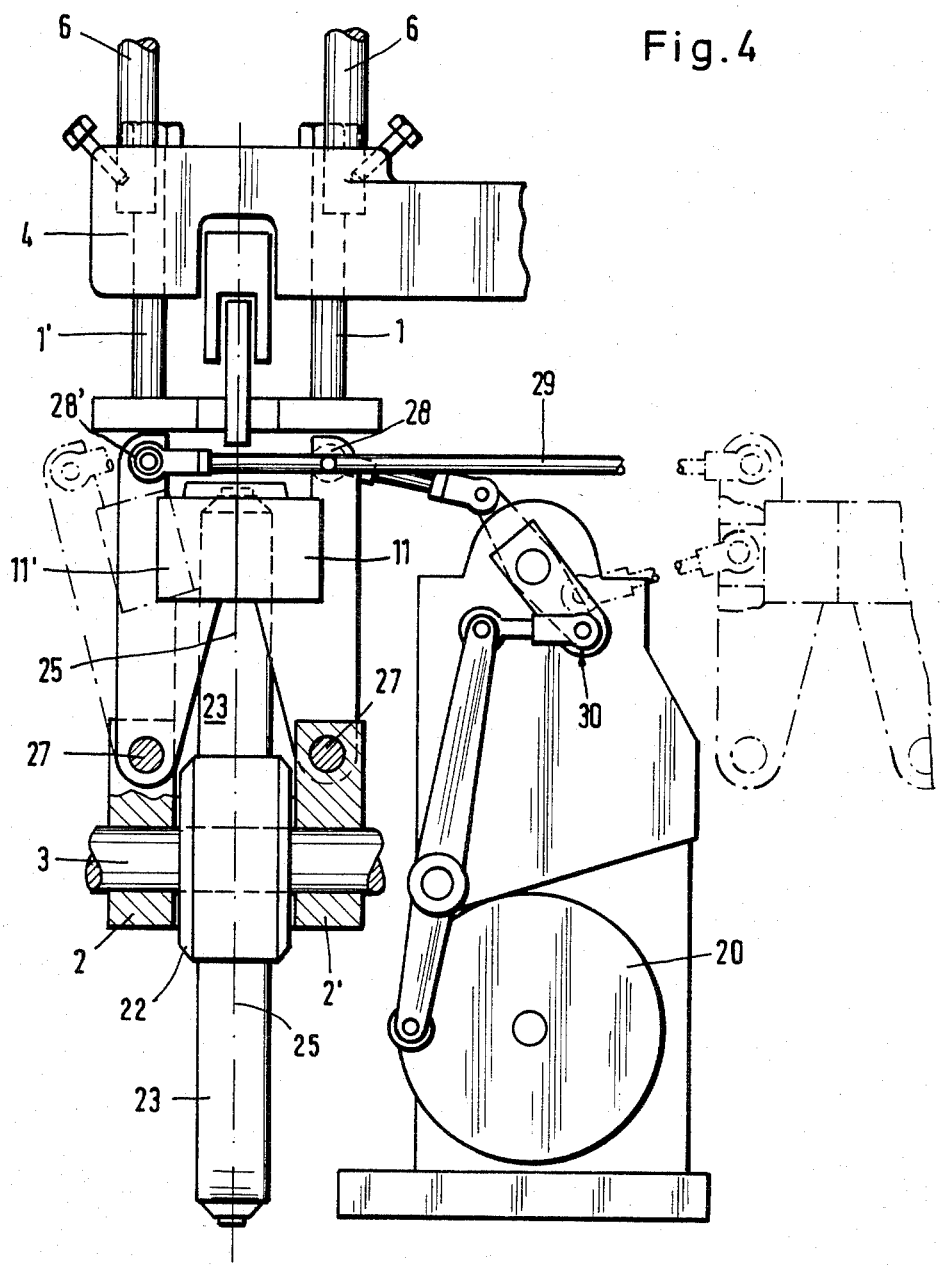
Figure 5:
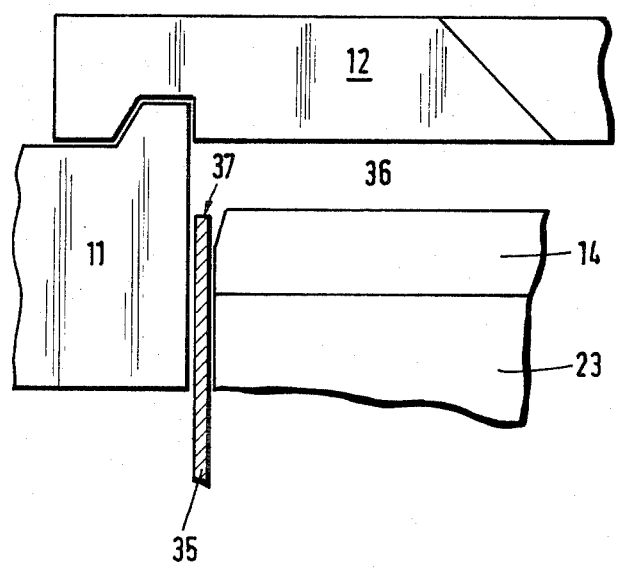
Figure 6:
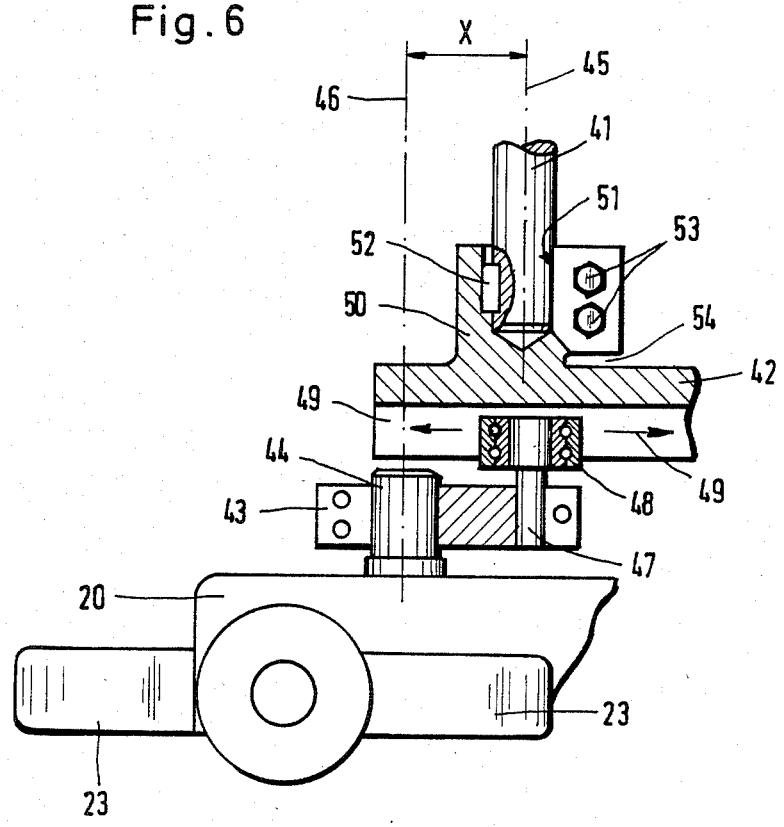
Figure 6A:
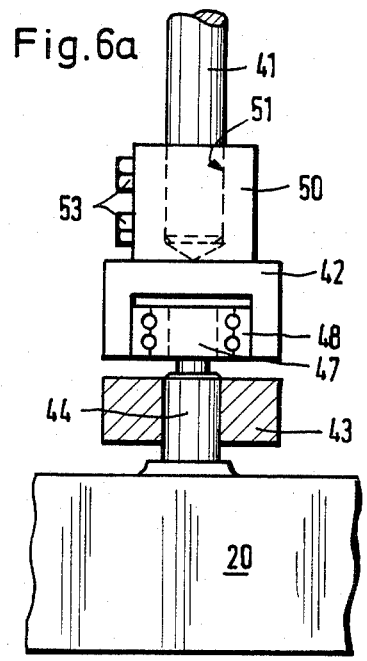
Figure 7:
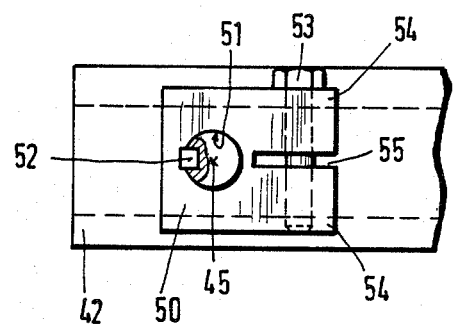
Figure 8:
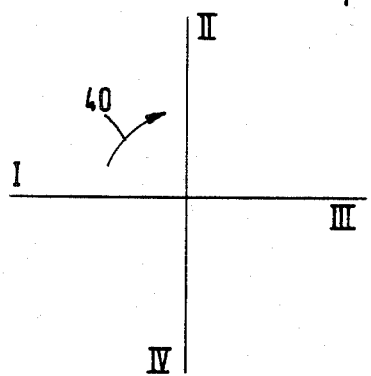
Figure 9:
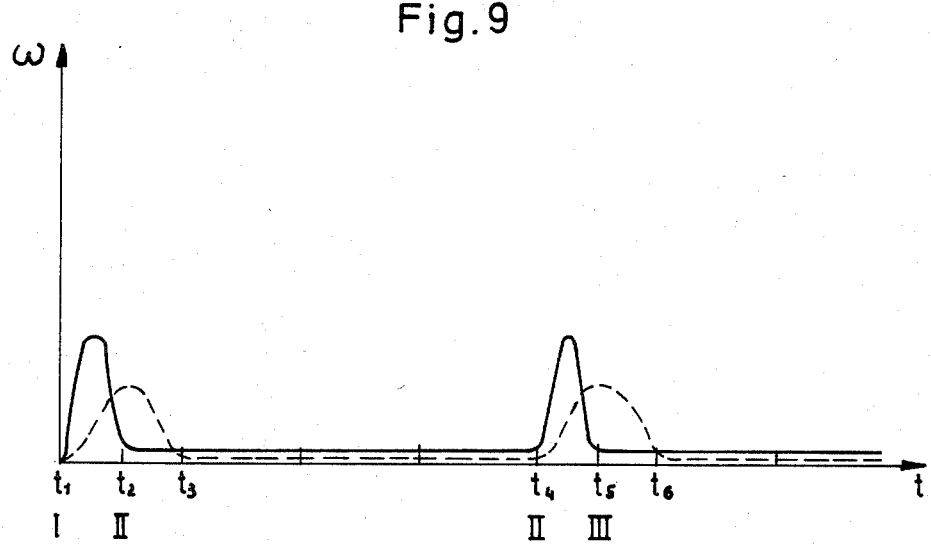

Further advantages, features and applications of the invention will emerge from the following description of a preferred example, in conjunction with the accompanying drawings, in which:

FIG. 1 is a longitudinal section through the apparatus of the invention, with the open state of the head plate shown to the left of the centre line and the closed state to the right, FIG. 2 is a plan view of the main supporting plate with the four tie rods, FIG. 3 is a sectional view along the line A—A in FIG. 1, FIG. 4 is a view similar to FIG. 1 but when the direction of viewing has been turned, so that in FIG. 1 one looks from left to right and thus sees the pivotable external mould portions, which are here shown as mould halves, FIG. 5 is a diagrammatic sectional view through part of the components of the apparatus forming the injection chamber, and to the length of web material, FIG. 6 is a broken away cross section through a preferred embodiment of the drive for the step-by-step mechanism, namely with a rocker arm, FIG. 6a is a side elevation of the rocker arm, looking from left to right in FIG. 6, FIG. 7 is a plan view of the clamping member and the rocker, not showing the crank or step-by-step mechanism, FIG. 8 is a diagram illustrating a mandrel wheel with four mandrels to show the change in position, and FIG. 9 is a time graph showing the angular speed of the particular mandrel wheel with the particular position allocated Four tie rods 1, 1', 1" and 1''', which are joined to the main supporting plate 4 at the top, establish the rearward connection with a bearing plate 2 for the drive shaft 3 of the mandrel wheel (22), a mandrel 23 of which is indeed shown in FIG. 4.

As shown in FIG. 1, the main axis of the complete injection unit 5, which is also the central axis 24 thereof, is vertical. When the central axis 25 of the mandrel 23 is aligned with the main axis 24 it is therefore also vertical. It will be clear from this that the bearing plate 2 is "at the bottom" and the main supporting plate 4 "above it".

The main supporting plate 4 is connected to the complete injection unit 5 by supporting shafts 6 fixed to the main supporting plate 4. The injection unit 5 can be moved vertically upwards and downwards along these shafts. The drive provided for the purpose is a hydraulic one (not shown).

The nozzle 26 can be seen at the lower end of the complete injection unit 5. The plastics is forced by the nozzle into the injection chamber 36.

It will be seen from FIG. 4 that the external mould portions 11, 11' can be pivoted around the shafts 27 and driven by the ball and socket joints 28 and 28' via connecting rods 29. FIG. 4 shows the possibility of providing a double station, with the connecting rods 29, which are joined to the ball and socket joints 28, 28', ultimately operated by the step-by-step mechanism 20 via a lever joint shown generally at 30. The step-by-step mechanism also provides the drive for the drive shaft 3, which is mounted in the bearing plates 2 and 2' as is again shown in FIG. 4.

The head plate 12, which can be moved up and down into the two positioned shown in FIG. 1, is fixed to the tool head plate support 33 which, like the head plate 12, encircles the nozzle region of the complete injection unit 5. The functions of the tool head plate support 33 are, acting through the toggle joint 7–10, to close the outer mould portions 11, 11', which have come together, by means of the cone 13 of the head plate 12 and to keep them closed, then to absorb the high pressures of the moulded piece from the injection chamber 36 with high pretensioning forces.

The drive for the tool head plate support 33 is provided by the hydraulically moved complete injection unit 5. The drive for this is a clamping means 15, shown in detail in FIG. 3, at the upper cylinder neck 16 of the unit 5; the neck carries the shaft 18 by means of a bracket 17. The drive bars 31, 31' are driven by means of the ball and socket joint 19 and in turn form the connection of the toggle joint 7–10. With the application of the nozzle 26 to the moulding tool, i.e. to the head plate 12, the entire tool is pretensioned.

FIG. 5 shows how the moulding chamber 36 is formed by the head plate 12 from above, the outer mould portions 11 (and 11' not shown) from the side and the core 14 from below, except for a gap in the region of the tube 35. The web material 35 is located in the gap with the upper severed surface 37 at the end projecting freely a certain distance into the moulding chamber 36, but with the outer surface in close contact with the inner surface of the outer mould 11. In FIG. 5 the tube 35 and the upper end thereof are shown with separate lines from the adjacent members 11, 14, 23, in order to show the individual components clearly. But in fact, since the gap between the members 11 and 14 is approximately 10% narrower than the thickness of the material 35, the moulding chamber f36 is sealed by the material 35. Plastics material which is injected from above through the centre of the head plate 12 can only come onto the upper free inside portion at the end of the tube 35 and onto the severed end surface 37; it cannot penetrate between the tube 35 and the mould portion 11.

The step-by-step mechanism 20 shown in FIG. 6 is commercially available. It has a stepping angle (movement in space) of 90° and a switching angle (movement in time) of 90°. FIGS. 8 and 9 should be referred to to gain a better understanding of the movement. In FIG. 8 a mandrel wheel is shown diagrammatically in the form of a cross, with a mandrel passing from position I along the curved arrow 40 and reaching position II after turning through 90°. In a concrete example a packing sleeve made of plastics coated paper could be thought of as being pushed onto the mandrel in position I but having the portion moulded on in position II. It naturally takes time e.g. to bring the necessary tool components into the correct position relative to the work piece, then for the actual moulding process and finally for cooling. The movement of the step-by-step mechanism 20 is indicated by a broken line in FIG. 9. The angular speed $\omega$ is plotted relative to the time t. At the time $t_1$ the mandrel in question begins to move from position I, e.g. in the direction of the arrow 40, into position II, which in the case of the broken line curve, i.e. with the conventional step-by-step mechanism 20, is reached only at time $t_3$. During the period between $t_3$ and $t_4$ the mandrel in question is in position II and at rest. The cycle then starts afresh, with the maximum angular speed of the mandrel wheel being reached at times $t_2$ and $t_5$ etc. if the wheel is controlled only by the step-by-step mechanism.

If the requirement is to have longer inoperative periods and to obtain the above-mentioned sine function of the movement of the step-by-step mechanism 20, then the construction shown in FIGS. 6 and 7 may be used.

In FIG. 6 the drive comes from a shaft 41, through the rocker 42 and crank 43, to the drive journal 44 and into the step-by-step mechanism 20. Axes 45 of the drive shaft 41 and the axis 46 of the drive journal 44 are spaced or offset from one another. The distance between them is indicated at X in FIG. 6.

More precisely, it will be seen from FIGS. 6, 6a and 7 that a crank 43 is fixed on the drive journal 44 and has a short and a long lever arm. A guide roller 48 is seated at the end of the long lever on a peg 47; when the rocker 42 rotates in its central axis 45 the roller 48 can be moved in the direction of the arrows 49. In this embodiment the rocker 42 is in turn provided with an integral accommodating sleeve 50 containing a hole 51. The drive shaft 41 is fixed in this hole by the spring 52 at one side and the clamping screws 53 at the other. The clamping action is made possible by a recess 54, which in fact allows for clamping movement of the two halves of the sleeve 50 separated by the slot 55 (FIG. 7), with the aid of the clamping screws 53.

If the rocker arm shown in FIGS. 6, 6a and 7 is set in motion, then the mandrel wheel driven by the step-by-step mechanism 20 carries out a movement such as that shown by the full line in FIG. 9 for a mandrel 23. Although the drive shaft 41 is driven at constant angular speed, the rocker 42 and its cam action do not ultimately drive the peg 44 at constant angular speed but rather at a varying one. The mandrel wheel 23 is consequently subjected to a movement in accordance with the full line curve in FIG. 9 on its way from position I to position II.

The movement of the mandrel 23 from position I begins at the time $t_1$, and the mandrel has reached its position II, offset by 90°, by the time $t_2$. As compared with the broken line curve, i.e. the movement of the commercially available step-by-step mechanism 20 as described above, the position is now that $$t_2 = (t_3 - t_1)/2$$

In other words the time taken for the mandrel to move from position I to position II is halved by the rocker 42 and its control function, so that the mandrel's stoppage time in position II is lengthened. This was the desired effect. It will be seen from FIG. 9 that the stoppage period runs from time $t_2$ to time $t_4$, after which the next rotation through 90° begins.

With the rocker arm one can now obtain a stepping angle (movement in space) of 90° but a switching angle (movement in time) of 45°. The stepping angle of 90° has to be maintained with a mandrel wheel with four mandrels in accordance with the above embodiment, whereas the switching angle, i.e. the movement in time, can be adapted.

If the guide roller 48 in the rocker 42 is looked at when moving alternately to left and right in the direction of the arrows 49 in FIG. 6 on rotation of the rocker 42, it will be realised that the crank 43 is turned faster, i.e. has a higher angular speed, the further away the guide roller 48 is from the axis 45 of the drive shaft 41. When the rocker 42 is rotating, the guide roller 48 generally moves in one half thereof, i.e. on one side of the central axis 45, and indeed oscillates within that half as indicated by the arrows 49. The axis 46 of the driving peg 44 is then a distance X away from the axis 45, and within the other half, in which the guide roller 48 does not in fact move.

We claim:

1. A method for moulding plastic components onto a length of flexible material which comprises:
   (a) placing a length of flexible material onto a mandrel;
   (b) positioning the mandrel into a moulding position by rotating a wheel to which the mandrel is attached;
   (c) moving external mould portions together about the mandrel covered with said material;
   (d) moving a head plate carrying an injection moulding nozzle into positive and frictional engagement with the external mould portions to hold them together such that said mandrel, said external mould portions and said head plate define a mould cavity for the plastic component;
   (e) injecting plastic material into the cavity through said nozzle;
   (f) moving said head plate and said external mould portions away from said mandrel;
   (g) moving said mandrel, covered with said length of material having a moulded plastic component on the material, away from said moulding position by again rotating said wheel;
   (h) positioning another mandrel covered with another length of tube material into said moulding position by rotating said wheel to which said other mandrel is attached; and
   (i) repeating steps c through g with respect to said other material and said other mandrel.

2. The method of claim 1 wherein the material is a tube material.

3. An apparatus for moulding a plastic component onto a length of flexible material, comprising a complete injection unit with a nozzle, a moulding-on head portion, an external mould portion and a core which is movable relative to these, characterised in that the core is arranged on the end of a mandrel which carries the length of material with it and which is part of a rotatable wheel driven in a circular path about a shaft, said mandrel projecting radially of said wheel, the external mould portion having at least two mould members which are pivotally movable apart and together about the mandrel to free the circular path of the mandrel, and the mould portions being held together by positive and frictional engagement of said mould portions with a movable head plate at the nozzle side.

4. The apparatus of claim 1, characterised in that a plurality of mandrels are part of said rotatable mandrel and each mandrel has a round cross section, that in the injecting position of each such mandrel its central axis is aligned with the central axis of the complete injection unit, and that in the injecting position at least two tie rods are spaced around the periphery parallel with the mandrel.

5. The apparatus of claim 1, characterised in that a coupling is fixed to the complete injection unit in order to connect drive rods which drive the head plate.

6. The apparatus of claims 5, characterised in that a gap is provided between the core and the external mould portions, the size of the gap being somewhat smaller, approximately 10% less, than the thickness of the flexible web material which has to be received in and seal the gap and which core and mould portions define the injection chamber.

7. The apparatus of claim 6, characterised in that the length of flexible web material which is clamped onto the mandrel projects from the gap into the injection chamber, while lying against the inner surface of the external mould portions, far enough to bring the uncoated severed end surface of the length of material to at least ½ mm away from the upper surface bounding the injection chamber.

8. The apparatus of claim 1, characterised in that the mandrel wheel is driven by a step-by-step mechanism with which the external mould portions are driven in a synchronously coupled movement and in that the material is a tube material.

9. The apparatus of claim 8, characterized in that the mandrel wheel is mounted rotatably in two stationary bearing plates which are joined to a main supporting plate by tie rods, and that the complete injection unit is held for linear movement on two supporting shafts fixed to the main supporting plate.

10. The apparatus of claim 8, characterised in that the step-by-step mechanism of the mandrel wheel is driven by means of a rocker arm, that the rocker arm has a clamping member, rotatable about an axis and with a cam fixed to it, whereby a cam follower is driven with guidance, that the cam follower is seated on a drive lever, the axis of which is the same as that of the step-by-step mechanism, and that the axis of the clamping member and the axis of the step-by-step mechanism are a distance away from each other.

11. The apparatus of claim 10, characterised in that the cam is a rail of U-shaped cross section, in which a guide roller is guided movably as a cam follower, and that the drive lever is a crank.

* * * * *

UNITED STATES PATENT AND TRADEMARK OFFICE
CERTIFICATE OF CORRECTION

PATENT NO. : 4,525,318
DATED : June 25, 1985
INVENTOR(S) : Wilhelm Reil, Ulrich Deutschbein, and Manfred Wallich It is certified that error appears in the above-identified patent and that said Letters Patent are hereby corrected as shown below:

Column 10, line 34, "The apparatus of claim 1" should read --The apparatus of claim 3--

Column 10, line 42, "The apparatus of claim 1" should read --The apparatus of claim 3--

Column 10, line 45, "The apparatus of claim 5" should read --The apparatus of claim 3, 5, 8 or 9--

Column 10, line 60, "The apparatus of claim 1" should read --The apparatus of claim 3--

Column 12, line 3 "a distance away from each other." should read --a distance (X) away from each other.--

Signed and Sealed this

Nineteenth Day of November 1985

[SEAL]

Attest:

DONALD J. QUIGG

Attesting Officer    Commissioner of Patents and Trademarks